United States Patent
Lefebvre et al.

(10) Patent No.: US 7,400,330 B2
(45) Date of Patent: Jul. 15, 2008

(54) MAGNIFICATION OF INDIRECTION TEXTURES

(75) Inventors: Sylvain Lefebvre, Bellevue, WA (US); Hugues H. Hoppe, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 357 days.

(21) Appl. No.: 11/171,923

(22) Filed: Jun. 30, 2005

(65) Prior Publication Data

US 2007/0002067 A1 Jan. 4, 2007

(51) Int. Cl.
- G09G 5/00 (2006.01)
- G09G 5/02 (2006.01)
- G09G 5/36 (2006.01)
- G06F 15/00 (2006.01)
- G06T 1/20 (2006.01)
- G06K 9/54 (2006.01)
- G06T 11/40 (2006.01)
- G06K 9/32 (2006.01)
- G06K 9/40 (2006.01)
- G06F 15/16 (2006.01)

(52) U.S. Cl. .............. 345/582; 345/552; 345/587; 345/606; 345/671; 382/300; 382/305; 382/274

(58) Field of Classification Search .......... 345/418, 345/426, 428, 581–583, 589, 618–619, 606, 345/612, 629–630, 597, 660, 670–671, 501–506, 345/543, 549, 552, 690, 584, 587, 586; 382/254, 382/266, 274, 300, 303–305
See application file for complete search history.

(56) References Cited

U.S. PATENT DOCUMENTS 5,097,427 A * 3/1992 Lathrop et al. .............. 345/587

(Continued)

FOREIGN PATENT DOCUMENTS

JP 9044655 2/1997

(Continued)

OTHER PUBLICATIONS

Liu, Y., Y. Tsin, and W.-C. Lin, The promise and peril of near-regular texture, IJCV, vol. 62, No. 1-2, pp. 149-159.

(Continued)

Primary Examiner—Wesner Sajous
(74) Attorney, Agent, or Firm—Lyon & Harr, L.L.P.; Craig S. Fischer

(57) ABSTRACT

An indirection texture magnification system and method for producing high-resolution indirection texture results. The system and method uses an indirection texture, designed for use with a low-resolution texture image, and a high-resolution texture image, which is a higher-resolution version of the low-resolution texture image. The indirection texture magnification system and method re-interprets an indirection texture computed for a low-resolution image so that a higher-resolution image can be used with the same indirection texture. This generates additional samples and allows the generation of a magnified, high-resolution indirection texture result. The indirection texture magnification system and method takes three or more neighboring pixel coordinates stored in an indirection texture and offsets those pixel coordinates in order to access the higher-resolution image with an increased precision. Colors obtained from adding this offset are combined to obtain a color for a corresponding pixel at a certain location in the magnified, high-resolution indirection texture result.

20 Claims, 10 Drawing Sheets

U.S. PATENT DOCUMENTS

| | | | |
|---|---|---|---|
| 5,438,654 A * | 8/1995 | Drebin et al. | 345/667 |
| 5,471,572 A * | 11/1995 | Buchner et al. | 345/671 |
| 5,740,277 A | 4/1998 | Katto | |
| 5,774,129 A | 6/1998 | Poggio et al. | |
| 5,784,498 A | 7/1998 | Venable | |
| 5,872,867 A | 2/1999 | Bergen | |
| 6,392,655 B1 | 5/2002 | Migdal | |
| 6,525,744 B1 | 2/2003 | Poggio et al. | |
| 6,593,933 B1 | 7/2003 | Xu | |
| 6,700,585 B2 | 3/2004 | Ritter | |
| 6,762,769 B2 | 7/2004 | Xu et al. | |
| 6,888,544 B2 | 5/2005 | Malzbender et al. | |
| 6,965,694 B2 | 11/2005 | Ueda et al. | |
| 6,999,095 B2 | 2/2006 | Wang et al. | |
| 7,002,591 B1 | 2/2006 | Leather et al. | |
| 7,034,841 B1 * | 4/2006 | Weiblen et al. | 345/582 |
| 2002/0122043 A1 | 9/2002 | Freeman | |
| 2002/0171660 A1 | 11/2002 | Lao | |
| 2003/0164838 A1 | 9/2003 | Guo | |
| 2003/0179923 A1 | 9/2003 | Xiong | |
| 2004/0075666 A1 | 4/2004 | Ritter | |
| 2004/0096120 A1 | 5/2004 | Tong | |
| 2004/0119720 A1 * | 6/2004 | Spangler | 345/583 |
| 2004/0233211 A1 | 11/2004 | Wang | |
| 2004/0234159 A1 | 11/2004 | Wang | |
| 2005/0007378 A1 * | 1/2005 | Grove | 345/582 |
| 2005/0013509 A1 | 1/2005 | Samadani | |
| 2005/0231519 A1 * | 10/2005 | Solanki et al. | 345/552 |
| 2005/0253863 A1 | 11/2005 | Mitchell et al. | |
| 2006/0001679 A1 | 1/2006 | Hamburg | |
| 2006/0028481 A1 | 2/2006 | Zhang et al. | |

FOREIGN PATENT DOCUMENTS

| | | |
|---|---|---|
| WO | WO2004055724 | 1/2004 |

OTHER PUBLICATIONS

Tanner, C., C. Migdal, and M. Jones, The clipmap: A virtual mipmap, *ACM Siggraph*, 1998, pp. 151-158.
Tong, X., J. Zhang, L. Liu, X. Wang, B. Guo and H.-Y. Shum, Synthesis of bidirectional texture functions on arbitrary surfaces, 2002, *ACM Siggraph*, pp. 665-672.
Tonietto, L., and M. Walter, Towards local control for image-based texture synthesis, *Proceedings of the 15th Brazilian Symposium on Comp. Graphics and Image Processing Sibgraphi*, 2002, pp. 252-258.
Wei, L.-Y. and M. Levoy, Fast texture synthesis using tree-structured vector quantization, *ACM Siggraph*, 2000, pp. 479-488.
Wei, L.-Y. and M. Levoy, Order-independent texture synthesis, http://graphics.stanford.edu/papers/texture-synthesis-sig03/, Rejected from *Siggraph* 2003.
Wei, L.-Y., Tile-based texture mapping on graphics hardware, *Graphics Hardware*, 2004, pp. 55-64.
Zalesny, A., V. Ferrari, G. Caenen, and L. Van Gool, Composite texture synthesis, *IJCV*, 2005, vol. 62, No. 1-2, pp. 161-176.
Zhang, J., K. Zhou, L. Velho, B. Guo, and H.-Y. Shum, Synthesis of progressively-variant textures on arbitrary surfaces, 2003, *ACM Siggraph*, pp. 295-302.
Co-pending U.S. Appl. No. 11/172,593, Parallel texture synthesis having controllable jitter, filed Jun. 30, 2005.
Co-pending U.S. Appl. No. 11/172,594, Sub-pass correction using neighborhood matching, filed Jun. 30, 2005.
Co-pending U.S. Appl. No. 11/171,920, Multi-level image stack of filtered images, filed Jun. 30, 2005.
Co-pending U.S. Appl. No. 11/174,231, Parallel texture synthesis by unsampling pixel coordinates controllable jitter, filed Jun. 30, 2005.
Adelson, E. H., C. H. Anderson, J. R. Bergen, P. J. Burt and J. M. Ogden, Pyramid methods in image processing, *RCA Engineer*, Nov./Dec. 1984, vol. 29, No. 6, pp. 33-41.
Ashikhmin, M., Synthesizing natural textures, *Symposium on Interactive 3D Graphics*, pp. 217-226.
Bar-Joseph, Z., El-Yaniv, R., Lischinski, D., and Werman, M. 2001, Texture mixing and texture movie synthesis using statistical learning, *IEEE TVCG*, vol. 7 No. 2, pp. 120-135.
Burt, P. J., E. Adelson, The Laplacian Pyramid as a compact image code, *IEEE Transactions on Communications*, Apr. 1983, vol. com-31 No. 4, pp. 532-540.
Cohen, M., J. Shade, S. Hiller, and O. Deussen, 2003, Wang tiles for image and texture generation, *ACM Siggraph*, pp. 287-294.
De Bonet, J., Multiresolution sampling procedure for analysis and synthesis of texture images, *ACM Siggraph*, pp. 341-346.
Garber, D., *Computational Models for Texture Analysis and Texture Synthesis*. PhD thesis, University of Southern California, 1981.
Kwatra, V., A. Schödl, I. Essa, G. Turk, and A. Bobick, Graphcut textures: Image and video synthesis using graph cuts, *ACM Siggraph*, 2003, pp. 277-286.
Lefebvre, S., and F. Neyret, Pattern based procedural textures, *Symposium and Interactive 3D Graphics*, 2003, pp. 203-212.
Liang, L., C. Liu, Y. Xu, B. Guo, and H.-Y. Shum, Real-time texture synthesis by patch-based sampling, 2001, *ACM TOG*, vol. 20, No. 3, 127-150.
Liu, Y., W.-C. Lin, and J. Hays, Near-regular texture analysis and manipulation, *ACM Siggraph*, 2004, pp. 368-376.
Cula, O.G. and K. J. Dana, Recognition Methods for 3D Textured Surfaces, available at http://www.ece.rutgers.edu/~kdana/research/spie01.pdf.
Leung, T., and Malik, J., Representing and recognizing the visual appearance of materials using three-dimensional textons, IJCV, vol. 43, No. 1, 2001, pp. 29-44.
Efros, A., and T. Leung, Texture synthesis by non-parametric sampling, ICV, 1999, pp. 1033-1038.
Fatahalian, K., Real-Time Global Illumination of Deformable Objects, available at: http://graphics.stanford.edu/~kayvonf/papers/seniorthesis03.pdf.
Gralewski, L., N. Campbell, Statistical synthesis of facial expressions for the portrayal of emotion available at http://delivery.acm.org/10.1145/990000/988867/p190-gralewski.pdf?key1=988867&key2=9951194411&coll= GUIDE&dl=GUIDE&CFID=69372413&CFTOKEN=85977336.
Hertzmann, A., C. Jacobs, N. Oliver, B. Cureless and D. Salesin, Image analogies, ACM SIGGRAPH,2001, pp. 327-340.
Hertzmann, A., and D. Zorin, Illustrating smooth surfaces, ACM SIGGRAPH, 2000, pp. 517-526.
Kwatra, V., I. Essa, A. Bobick, and N. Kwatra, Texture optimization for example-based synthesis, ACM SIGGRAPH, 2005, pp. 795-802.
Lai, Y.-K., S.-M. Hu, D. Gu, and R. Martin, Geometric texture synthesis and transfer via geometry images, Proc. of SMA, 2005, pp. 15-26.
Lefebvre, S., and H. Hoppe, Parallel controllable texture synthesis, ACM SIGGRAPH, 2005, pp. 777-786.
Magda, S., and D. Kriegman, Fast texture synthesis on arbitrary meshes, Eurographics Symposium on Rendering, 2003, pp. 82-89.
Malik, J., S. Belongie, J. Shi, and T. Leung, Textons, contours and regions: Cue integration in image segmentation, ICCV, 1999, pp. 918-925.
Neyret, F., and M.-P. Cani, Pattern-based texturing revisited, ACM Siggraph, 1999, pp. 235-242.
Neyret, F., Advected textures, Symposium on computer animation, 2003, pp. 147-153.
Popat, K., and Picard, R., Novel cluster-based probability model for texture synthesis, classification, and compression, Visual Communications and Image Processing, 1993, pp. 756-768.
Praun, E., A. Finkelstein, and H. Hoppe, Lapped textures, ACM Siggraph, 2000, pp. 465-470.
Roweis, S., EM algorithms for PCA and SPCA, NIPS, 1997, pp. 626-632.
Roweis, S., and L. Saul, Nonlinear dimensionally reduction by locally linear embedding, Science, 2000, vol. 290, pp. 2323-2326.
Sloan, P.-P., Liu, X., , H.-Y. Shum and J. Snyder, Bi-scale radiance transfer, ACM Siggraph, 2003, pp. 370-375.
Soler, C., M.-P. Cani, and A. Angelidis, Hierarchical pattern mapping, ACM Siggraph, 2002, pp. 673-680.

Tenenbaum, J., V. de Silva, and J. Langford, A global geometric framework for nonlinear dimensionality reduction, Science, 2000, vol. 290, pp. 2319-2323.

Turk, G., Texture synthesis on surfaces, ACM Siggraph, 2001, pp. 347-354.

Turk, G., Generating textures on arbitrary surfaces using reaction-diffusion, Proceedings of the 18th Annual Conf. on Comp. Graphics and Interactive Techniques, 1991, pp. 289-298.

Wang, L., X. Gu, K. Mueller and S.-T. Yau, Uniform texture synthesis and texture mapping using global parameterization, J. The Visual Comp., pp. 801-810.

Wei, L.-Y., and M. Levoy, Texture synthesis over arbitrary manifold surfaces, ACM Siggraph, 2001, pp. 355-360.

Wu, Q., and Y. Yu, Feature matching and deformation for texture synthesis, ACM Siggraph, 2004, pp. 362-365.

Ying, L., A. Hertzmann, H. Biermann, and D. Zorin, Texture and shape synthesis on surfaces, Eurographics Workshop on Rendering, 2001, pp. 301-312.

Aaron M. Guertin, Office Action, U.S. Appl. No. 11/172,594, Mailed Oct. 15, 2007.

Aaron M. Guertin, Office Action U.S. Appl. No. 11/172,593, Mailed Sep. 13, 2007.

Stephen R. Koziol, Office Action, U.S. Appl. No. 11/171,920, Mailed Sep. 19, 2007.

Co-pending U.S. Appl. No. 11/428,311, Anisometric texture synthesis, filed Jun. 30, 2006.

Co-pending U.S. Appl. No. 11/426,564, Texture synthesis using dimensionality-reduced appearance space, filed Jun. 26, 2006.

Co-pending U.S. Appl. No. 11/428,355, Synthesis of advecting texture using adaptive regeneration, filed Jun. 30, 2006.

* cited by examiner

MAGNIFICATION OF INDIRECTION TEXTURES

BACKGROUND

Texture mapping is an efficient and popular way to add details on surfaces in computer graphics applications. However, creating large and detailed texture maps is a difficult and tedious task. Moreover, these texture maps are usually at high resolution and often do not fit into available memory. Texture synthesis algorithms (such as sample-based texture synthesis techniques) are aimed at automatically generating large textures from a small example image (known as a texture sample or exemplar). Sample-based texture synthesis both reduces content creation time and storage requirements since the large texture can be generated from the exemplar and a set of parameters.

In general, sample-based texture synthesis takes a low-resolution texture image (called an exemplar image) and generates additional content based on that exemplar image to create much more content that is contained in the exemplar image. Sample-based texture synthesis analyzes a given exemplar image to create visually similar images. In graphics, these images often contain surface attributes like colors and normals, as well as displacement maps that define geometry itself. Sample-based texture synthesis alleviates the need to store explicitly an entire expanse of content. Instead, the content is generated "on the fly" from the much smaller exemplar image.

The output of many texture synthesis algorithms can be interpreted as indirection textures. An indirection texture is a texture that stores the coordinates of pixels contained in a separate texture image. A key feature of an indirection texture is that the pixel coordinates map directly to pixels in the separate texture image. In this manner, a color of a pixel can be retrieved given the pixel coordinate.

One drawback, however, of texture synthesis applications is that it is expensive to generated high-resolution results. Often it is desirable to obtain high-resolution textures, but most texture synthesis techniques do not produce high-resolution output because it is too expensive. In order to obtain a high-resolution result, the texture synthesis technique must be applied several times, thereby increasing expense. For this reason, current texture synthesis applications typically produce low-resolution indirection texture results.

SUMMARY

The invention disclosed herein includes an indirection texture magnification system and method for producing a magnified, high-resolution indirection texture result. The indirection texture magnification system and method re-interprets an indirection texture computed for a low-resolution image so that a higher-resolution image can be used with the same indirection texture. This generates additional samples and allows the generation of a magnified, high-resolution indirection texture result. The indirection texture magnification system and method takes three or more neighboring pixel coordinates stored in an indirection texture and offsets those pixel coordinates in order to access the higher-resolution image with an increased precision. Using a single offset from a single neighboring pixel coordinate would be sufficient for magnification, but would result in visual discontinuities in the magnified indirection texture result. In contrast, the indirection texture magnification system and method use 3 or more neighboring pixel coordinates and blends them in a weighted combination to obtain a continuous magnified indirection texture result.

The indirection texture magnification system and method allow the generation of a magnified, high-resolution indirection texture result from an indirection texture containing image coordinates and a high-resolution texture image. The indirection texture was originally designed for use with a low-resolution texture image. Additional samples necessary to produce the magnified, high-resolution indirection texture result are obtained by combining multiple colors retrieved from the high-resolution image through modified pixel coordinates.

The indirection texture magnification system and method supports magnification across an indirection texture but interpolates between pixels in a low-resolution indirection texture result to obtain additional samples for a magnified, high-resolution indirection texture result. This is achieved in part by computing and adding an offset to the pixel coordinates contained in the indirection texture. Colors obtained from adding this offset are combined to obtain a color for a corresponding pixel at a certain location in the magnified, high-resolution indirection texture result.

DRAWINGS DESCRIPTION

Referring now to the drawings in which like reference numbers represent corresponding parts throughout:

DETAILED DESCRIPTION

Figure 1:
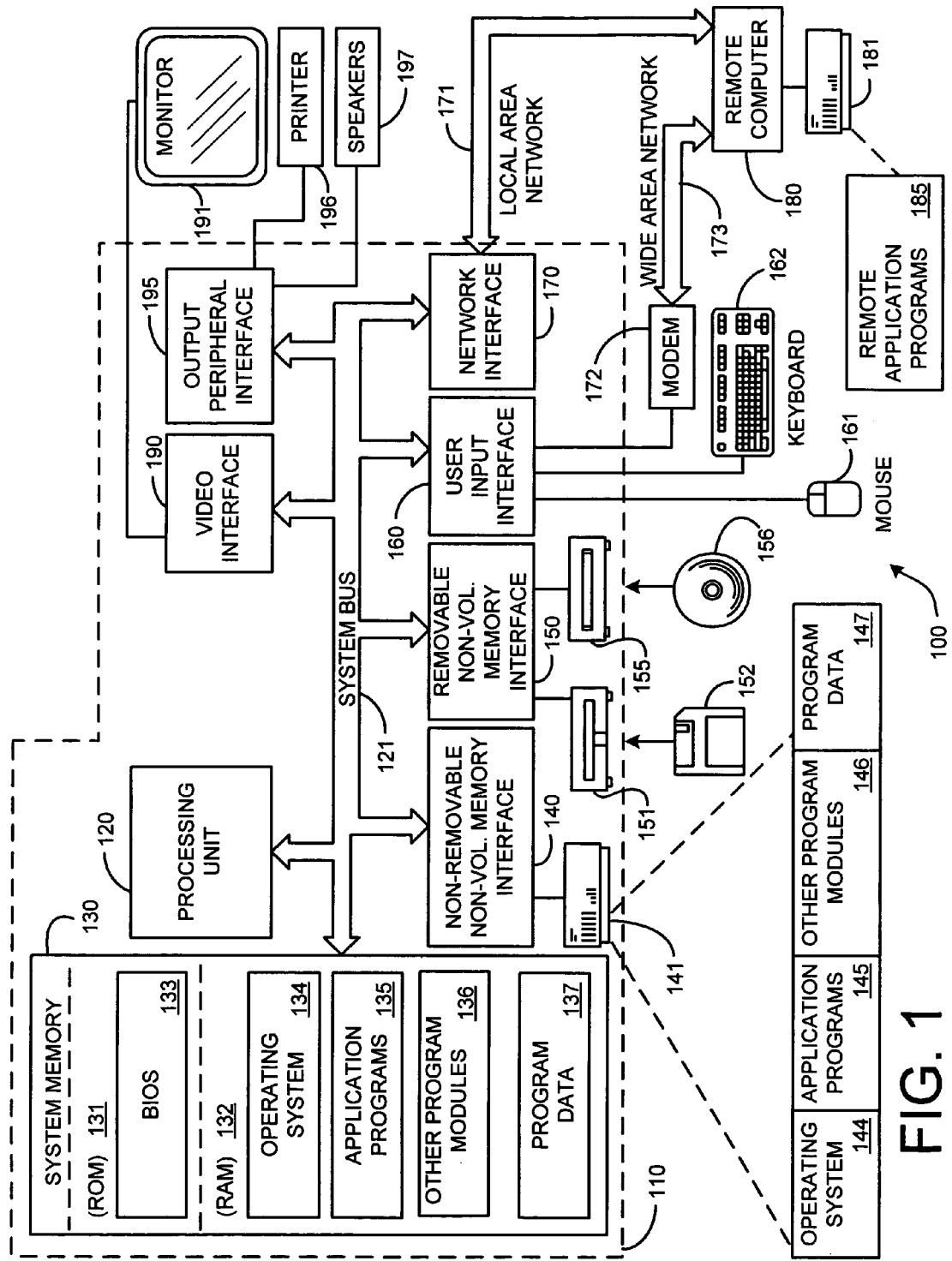
FIG. 1 illustrates an example of a suitable computing system environment in which the indirection texture magnification system and method may be implemented.

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

In computer graphics, sample-based texture synthesis allows the creation of a texture from a small exemplar image. However, texture synthesis applications typically only produce low-resolution results, due to the expense involved in generating high-resolution results. In order to obtain a high-resolution result, the texture synthesis technique must be applied several times, thereby greatly increasing expense. Note that the output of many texture synthesis algorithms can be interpreted as an indirection texture. The indirection texture magnification system and method greatly improves the result of texture synthesis applications at low computational cost. Moreover, the indirection texture magnification system and method can be applied to any indirection texture.

The indirection texture magnification system and method defines an interpolation algorithm based on coordinates stored in an indirection texture that was originally designed for use with a low-resolution texture image. The system and method are used to access a high-resolution texture image in order to efficiently produce a higher-resolution result than can be obtained using the low-resolution texture image. The general idea is to modify the coordinates stored in the indirection texture to exploit the additional pixels from an image at a higher-resolution than the image used to create the indirection texture. It should be noted that indirection texture itself is not modified by the indirection texture magnification system and method. Rather, the modification that is referred to here only happens in a computation, and does not have any side-effect on the stored indirection texture. This modification produces a result with a higher resolution than otherwise possible, which significantly increases the visual quality. In the context of texture synthesis, a low-resolution version of the texture using a low-resolution texture image first is synthesized, indirection textures then are generated, and a higher-resolution texture image then is accessed using the indirection texture to efficiently enhance the image. Alternatively, the indirection texture can be used to access a different texture image such as a differently shaded version of the same texture. Existing techniques retrieve colors by looking up exactly the pixel coordinates in the indirection texture, without any use of an offset or additional samples. Thus, there is no magnification or higher resolution result. Moreover, as discussed below in connection with FIG. 6B, existing techniques may combine colors obtained from the four nearest coordinates using bilinear interpolation. However, this increases the resolution of an image (in terms of number of pixels) but produces a blurred result, since no new information is introduced).

II. Exemplary Operating Environment

The indirection texture magnification system and method disclosed herein are designed to operate in a computing environment. The following discussion is intended to provide a brief, general description of a suitable computing environment in which the indirection texture magnification system and method may be implemented.

FIG. 1 illustrates an example of a suitable computing system environment in which the indirection texture magnification system and method may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The indirection texture magnification system and method is operational with numerous other general purpose or special purpose computing system environments or configurations. Examples of well known computing systems, environments, and/or configurations that may be suitable for use with the indirection texture magnification system and method include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The indirection texture magnification system and method may be described in the general context of computer-executable instructions, such as program modules, being executed by a computer. Generally, program modules include routines, programs, objects, components, data structures, etc., that perform particular tasks or implement particular abstract data types. The indirection texture magnification system and method may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the indirection texture magnification system and method includes a general-purpose computing device in the form of a computer 110.

Components of the computer 110 may include, but are not limited to, a processing unit 120 (such as a central processing unit, CPU), a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within the computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 120 through a user input interface 160 that is coupled to the system bus 121, but may be connected by other interface and bus structures, such as, for example, a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

III. General Overview

Figure 2:
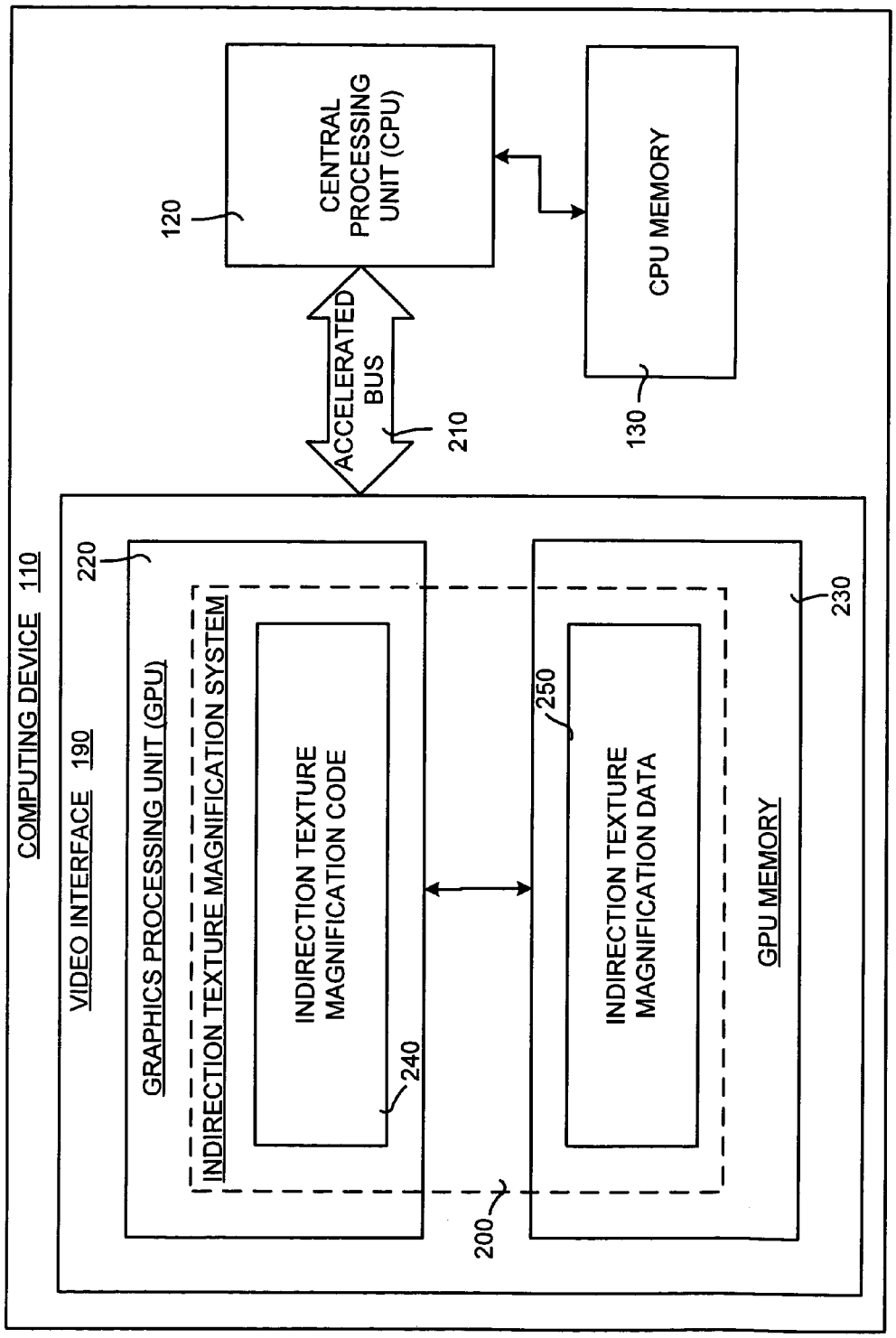
FIG. 2 is a block diagram illustrating an exemplary parallel implementation of the indirection texture magnification system and method disclosed herein.

FIG. 2 is a block diagram illustrating an exemplary parallel implementation of the indirection texture magnification system and method disclosed herein. It should be noted that FIG. 2 is merely one of several ways in which the indirection texture magnification system and method may be implemented and used. The indirection texture magnification system and method may also be implemented on other types of processing systems, such as on a central processing unit (CPU) or multi-core processing systems.

As shown in FIG. 2, the computing device 110 contains the central processing unit (CPU) 120 and the CPU memory 130. The CPU is in communication with the video interface 190 through an accelerated bus 210. By way of example and not limitation, this bus 210 may be an Accelerated Graphics Port (AGP) or the newer PCI Express, which are designed especially for the throughput demand of 3-D graphics.

The video interface 190 includes a graphics processing unit (GPU) 220 and a GPU memory 230. GPUs are designed to accelerate real-time 3-D graphics display. The GPU 220 is capable of transferring data to the CPU 120 over the bus 210. The indirection texture magnification system 200 is also in communication with the GPU 220 and the GPU memory 230. The indirection texture magnification system 200 is shown in FIG. 2 by the dashed lines. In the implementation shown in FIG. 2, the system 200 includes an indirection texture magnification code 240 residing on the GPU 220, and indirection texture magnification data 250 residing in the GPU memory 230.

IV. Structural Overview

The structure of the indirection texture magnification system disclosed herein now will be discussed. In order to more fully understand the structure of the indirection texture magnification system, the details of exemplary embodiments are presented. However, it should be noted that these exemplary embodiments are only a few of several ways in which the indirection texture magnification system may be implemented and used.

Figure 3:
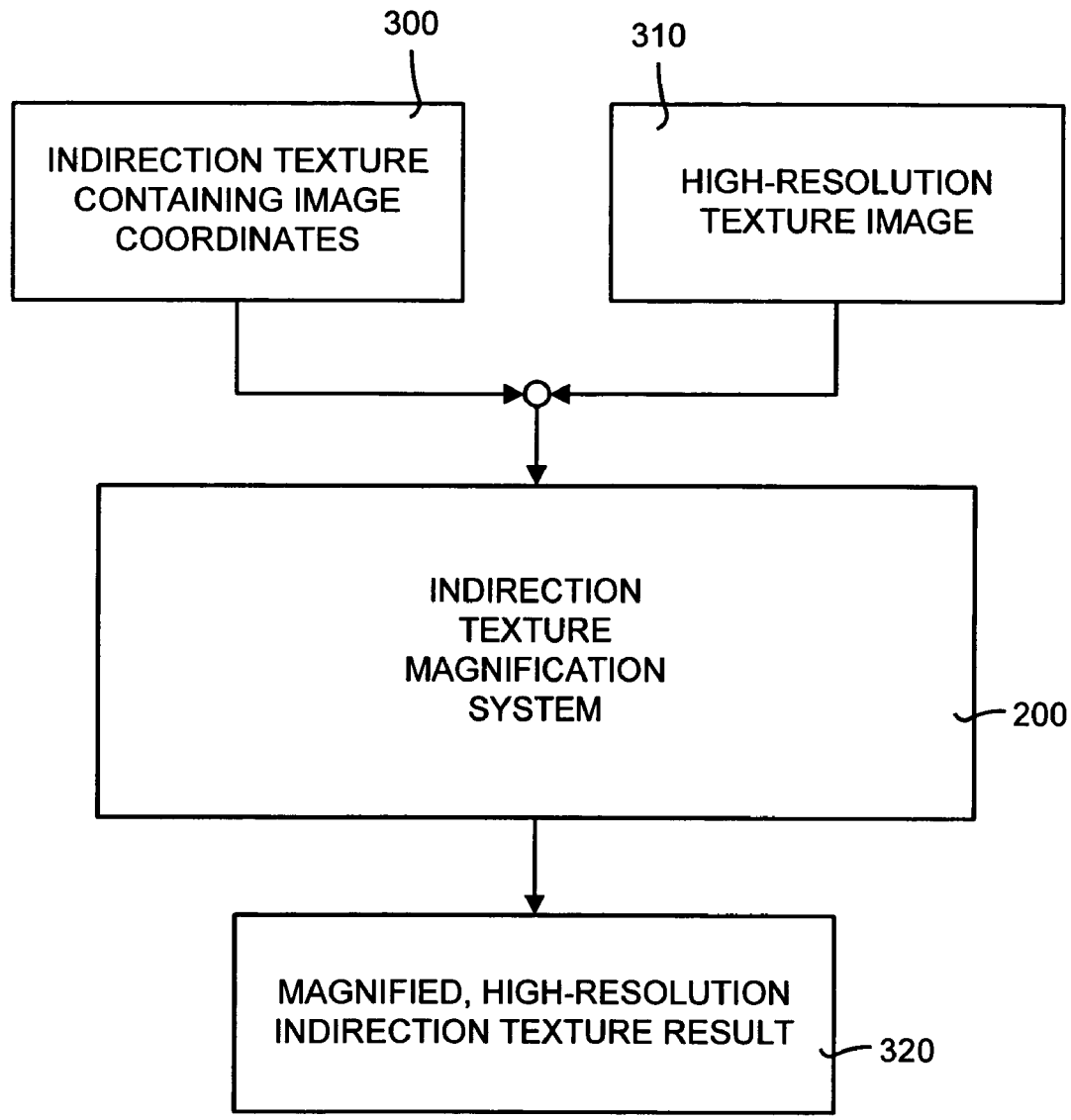
FIG. 3 is a general block diagram illustrating an overview of the components of indirection texture magnification system shown in FIG. 2.

FIG. 3 is a general block diagram illustrating an overview of the components of indirection texture magnification system 200 shown in FIG. 2. In general, the indirection texture magnification system 200 takes a low-resolution indirection image result (not shown) and outputs a magnified and higher-resolution version of that result. Specifically, the indirection texture magnification system 200 inputs an indirection texture containing image coordinates 300 and high-resolution texture image 310. Both the indirection texture 300 and the high-resolution texture image 310 are processed by the indirection texture magnification system 200. The output is a magnified, high-resolution indirection texture result 320.

V. Operational Overview

Figure 4:
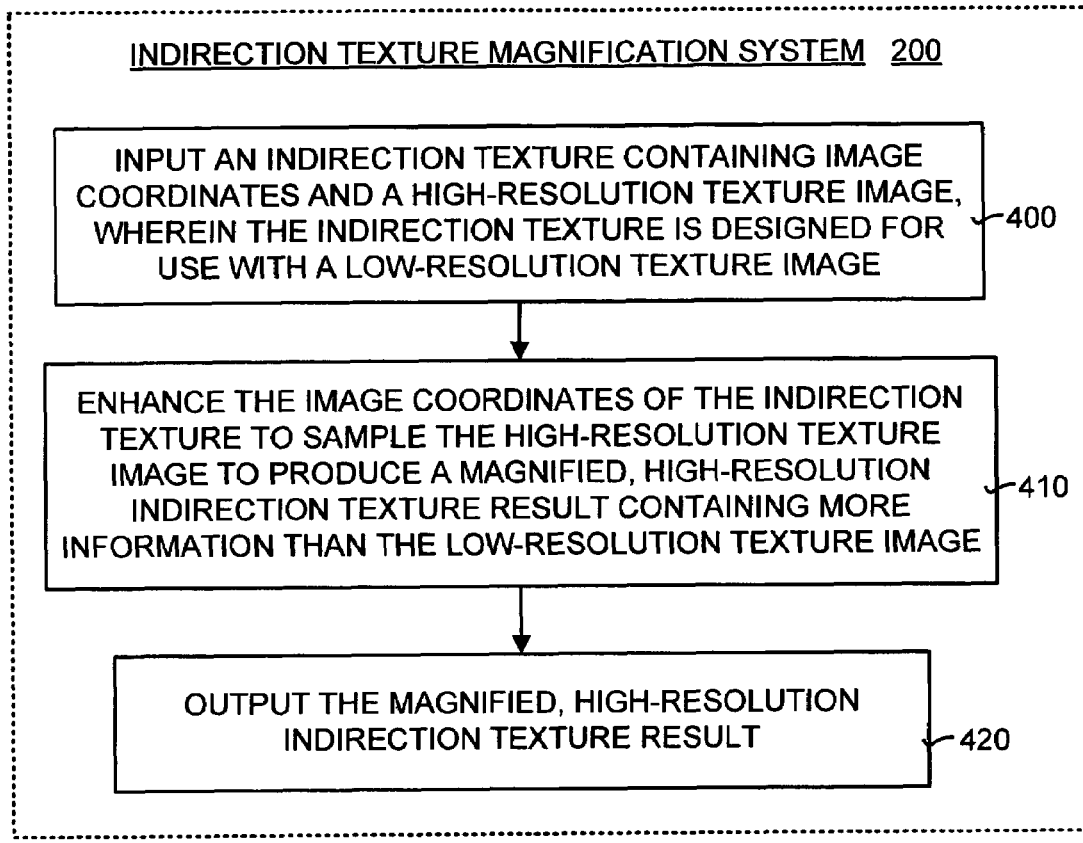
FIG. 4 is a general flow diagram illustrating the general operation of the indirection texture magnification system shown in FIGS. 2 and 3.

FIG. 4 is a general flow diagram illustrating the general operation of the indirection texture magnification system 200 shown in FIGS. 2 and 3. In general, the indirection texture magnification method is used to generate a magnified high-resolution indirection texture result using an indirection texture containing image coordinates for a low-resolution texture image and a high-resolution texture image. The additional samples necessary to create this high-resolution texture image are obtained by combining multiple colors retrieved from the high-resolution texture image using modified coordinates from the indirection texture. This generates colors for the additional pixels.

In particular, as shown in FIG. 4, the indirection texture magnification method begins by receiving as input an indirection texture containing image coordinates and a high-resolution texture image (box 400). The indirection texture is designed for use with a low-resolution texture image. Accordingly, the image coordinates in the indirection texture map to pixels in a low-resolution texture image, such as is obtained from a texture synthesis technique.

The image coordinates of the indirection texture are enhanced to sample the high-resolution texture image and produce a magnified, high-resolution indirection texture result (box 410). As explained in detail below, the enhancing of the image coordinates includes adding an offset to the coordinates to make use of the additional samples of the high-resolution texture image. The magnified, high-resolution indirection texture result contains more information than the low-resolution texture image. This magnified, high-resolution indirection texture result is the output of the indirection texture magnification method (box 420).

VI. Operational Details and Results

Figure 5:
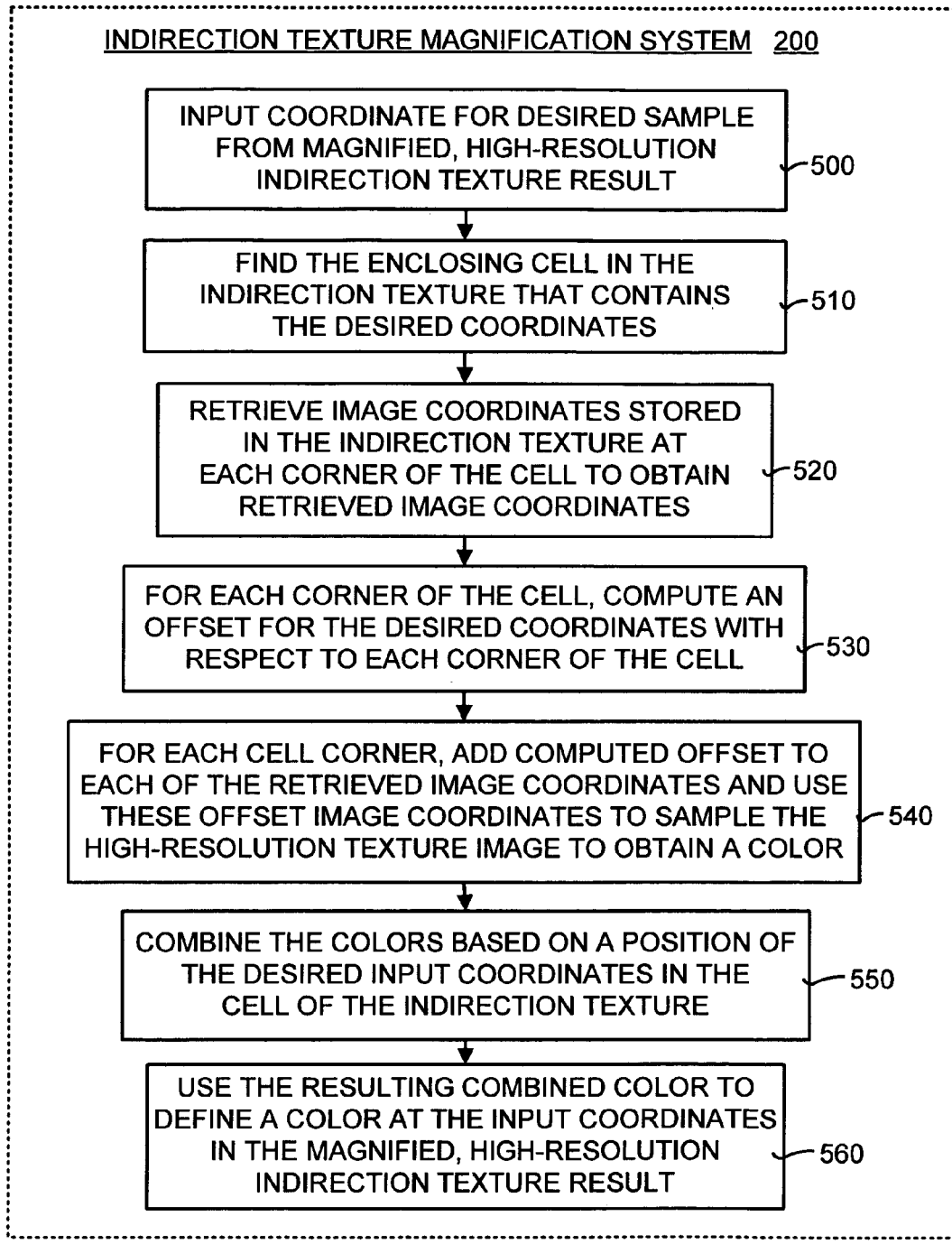
FIG. 5 is a flow diagram illustrating details of the indirection texture magnification method shown in FIG. 4.

FIG. 5 is a flow diagram illustrating details of the indirection texture magnification method shown in FIG. 4. While FIG. 4 illustrates the general operation of the indirection texture magnification method, FIG. 5 shows the process performed on a single pixel by the indirection texture magnification method. The process begins by inputting a coordinate for a desired sample from the magnified, high-resolution indirection texture result (box 500). In other words, it is desired to find a color for a pixel in the magnified, high-resolution indirection texture result, and the pixel's coordinates are input. As stated above, the process shown in FIG. 5 is per pixel, such that the process shown in FIG. 5 is repeated until all the pixels in the magnified, high-resolution indirection texture result are found.

Next, an enclosing cell is found within the indirection texture that contains the desired coordinates (box 510). In one preferred embodiment, the enclosing cell is a square that uses four samples from the indirection texture. In another preferred embodiment, the enclosing cell contains three sample from the indirection texture and forms a triangle. The triangle enclosed cell can be formed by drawing a line between any opposing corners of the square enclosing cell.

Image coordinates stored in the indirection texture at each corner of the enclosing cell are retrieved to obtain retrieved image coordinates (box 520). By way of example, for a square enclosing cell, four samples or image coordinates contained in the indirection texture are retrieved. For each corner of the enclosing cell, an offset is computed for the desired coordinates with respect to each corner of the enclosing cell (box 530).

For each corner of the enclosing cell, the computed offset is added to each of the retrieved image coordinates to obtain offset image coordinates (box 540). These offset image coordinates are used to sample the high-resolution texture image. As a result of this sampling, a color is obtained for each of the offset image coordinates, or, equivalently, for each of the corners. These colors are combined based on the relative position of the desired coordinates in the enclosing cell of the indirection texture (box 550). The resultant color obtained from the combining of the colors of the offset image coordinates (or, in other words, the colors of the corners) is used to define a color at the desired coordinates in the magnified, high-resolution indirection texture result (box 560). As stated above, the above process is repeated for each pixel in the magnified, high-resolution indirection texture result until each pixel has a color. The result is the magnified, high-resolution indirection texture result.

Figure 6A:
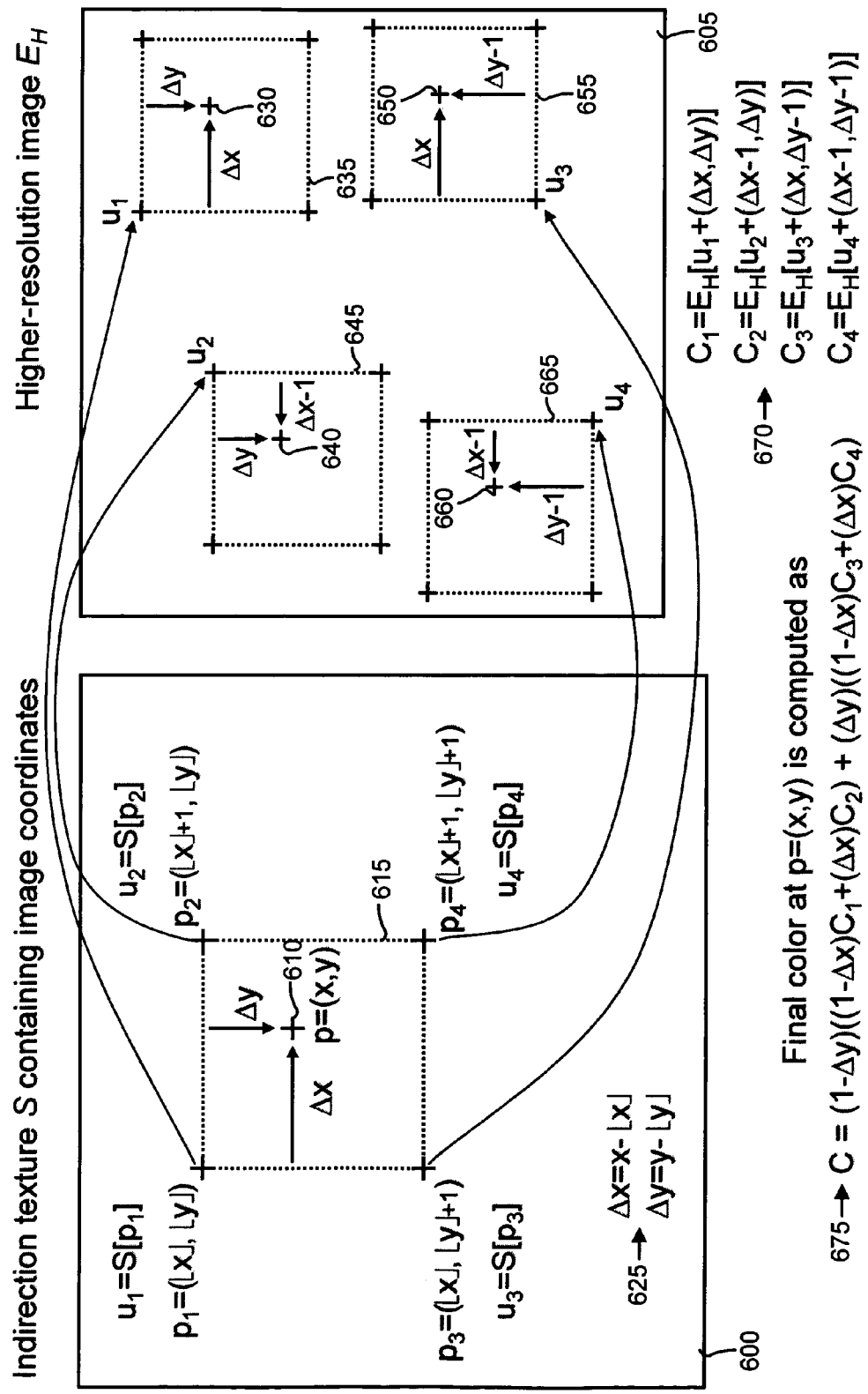
FIG. 6A illustrates an exemplary example of the indirection texture magnification method shown in FIGS. 4 and 5.

FIG. 6A illustrates an exemplary example of the indirection texture magnification method shown in FIGS. 4 and 5. It should be noted that the example shown is for a single desired pixel in a magnified, high-resolution indirection texture result. Typically, the process shown in FIG. 6A is repeated for each pixel in the magnified, high-resolution indirection texture result.

FIG. 6A shows an indirection texture, S, containing image coordinates 600, and a high-resolution texture image $E_H$ 605. Desired coordinates from the magnified, high-resolution indirection texture result are given as p=(x,y) at point p 610. An enclosing cell 615 is defined by samples at each corner of the enclosing cell 615, given by $p_1$, $p_2$, $p_3$ and $p_4$. Each corner is represented in terms of the desired coordinates, p=(x,y) 610. The symbol around the x and y coordinates means to "take the floor" of the value, or round down to the nearest integer value.

In this exemplary example, the enclosing cell 615 contains four corners, $p_1$, $p_2$, $p_3$ and $p_4$, and is a square. Alternatively, the enclosing cell 615 may be a right isosceles triangle containing three corners. This can be achieved by dividing the square enclosing cell 615 into two right isosceles triangles along a diagonal of the square enclosing cell 615.

Figure 6B:
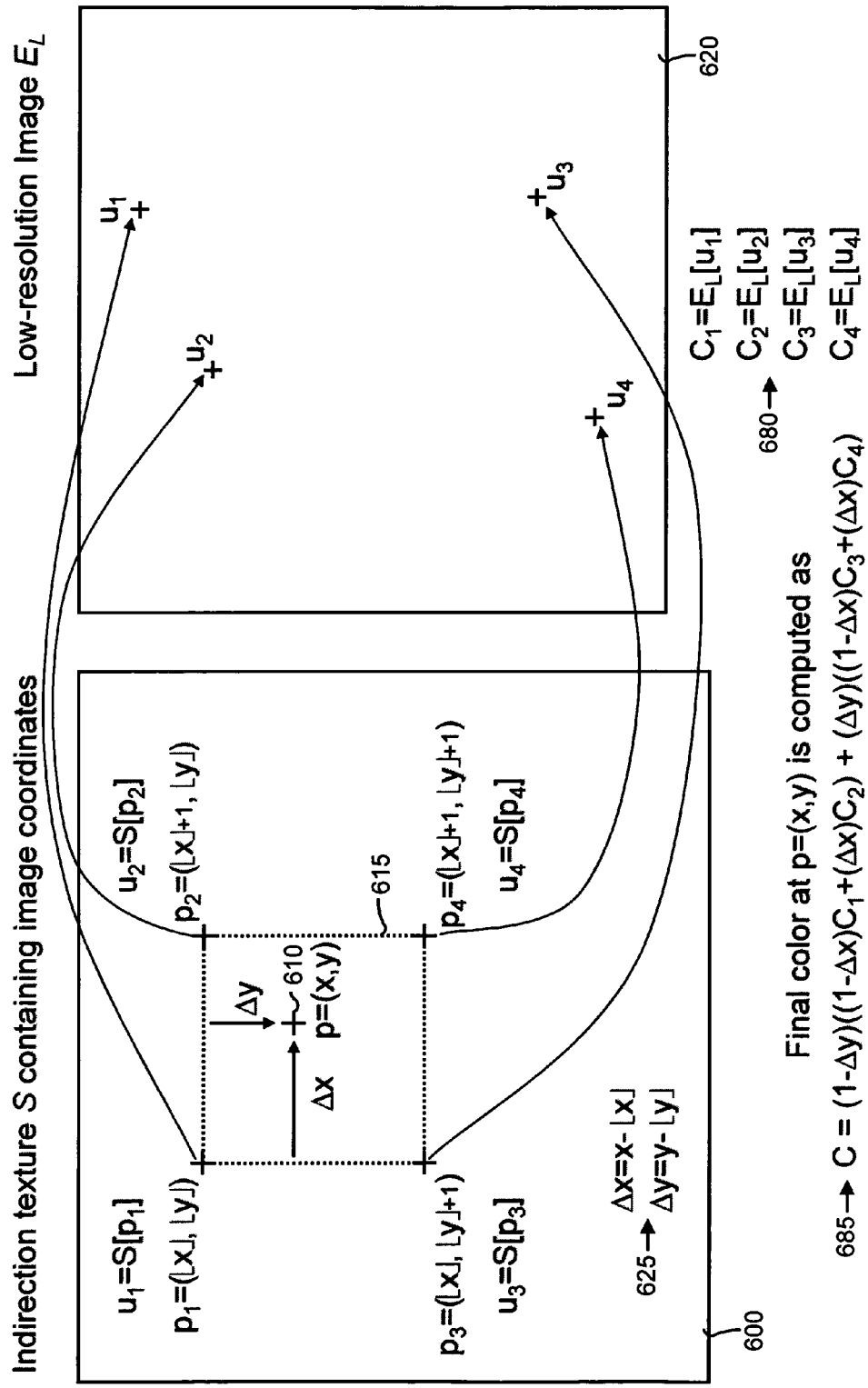
FIG. 6B illustrates a comparison between a prior art indirection texture method and the indirection texture magnification method of FIG. 6A.

A low-resolution texture image, $E_L$ 620, shown in FIG. 6B, has a size of m×m pixels and stores colors at integer coordinates. The pixel coordinates in the high-resolution texture image $E_H$ 605 lay on an integer grid (not shown). All pixel coordinate values are integers having a range: $1 \leq x \leq m$ and $1 \leq y \leq m$.

The indirection texture S 600 has a size of n×n pixels. Image coordinates (x,y) in the upper left of the indirection texture S 600 are equal to (1,1), while the coordinates at the lower right corner are (n,n). In addition, the image coordinates stored in the indirection texture S 600 lay on an integer grid (not shown). The values stored in the indirection texture are located at integer coordinates. The values themselves are coordinates in the low-resolution texture image $E_L$ 620. Therefore the values are integer values in the range (1,1) to (m,m).

The high-resolution texture image $E_H$ 605 has size σ (m×m), where σ is a multiplication factor. The multiplication factor, σ, is the ratio of a size of the high-resolution texture image $E_H$ 605 over a size of a low-resolution texture image, $E_L$ 620, shown in FIG. 6B. Pixel coordinates (x,y) in the upper left of the high-resolution texture image $E_H$ 605 are equal to (1,1), while the coordinates at the lower right corner are (m,m). Thus, since the high-resolution texture image $E_H$ contains a higher density of pixels than the low-resolution texture image $E_L$, pixels are not only on the integer grid but also in between integer locations. In particular σ×σ pixels can be found between four integer locations (or within an integer cell) in the two-dimensional high-resolution texture image $E_H$.

Image coordinate values in the indirection texture S 600 and in the low-resolution texture image $E_L$ 620 lay in integer coordinates of a grid. On the other hand, the magnified pixel coordinates in the high-resolution texture image $E_H$ 605 may have no integer coordinates. This is because there is more information in the high-resolution texture image $E_H$ 605 than in the low-resolution texture image $E_L$ 620. This is because the high-resolution texture image $E_H$ 605 has a magnification factor, σ. A typical value for σ is σ=4. Note that the high-resolution texture image $E_H$ 605 has the same coordinate system as the low-resolution texture image $E_L$ 620, ranging from 1 to m. However, the high-resolution texture image $E_H$ 605 has a higher density of samples or pixels.

The enclosing cell 615 of the indirection texture S 600 has no pixel coordinates in between the integer coordinates. However, the high-resolution texture image $E_H$ 605 does have pixels in between the integer coordinates, because the high-resolution texture image $E_H$ 605 has more samples than the low-resolution texture image $E_L$ 620. Note that the low-resolution texture image $E_L$ 620 does not have pixels in between the integer coordinates. For the square enclosing cell 615, the high-resolution texture image $E_H$ 605 contains a factor of $\sigma^2$ more pixels than the low-resolution texture image $E_L$ 620.

An offset 625 is computed for the desired coordinates p 600 with respect to each of the four cell corners, $p_1, p_2, p_3$ and $p_4$, which lay on the integer grid. The formula is shown in FIG. 6A for an offset in the x-direction (Δx) and an offset in the y-direction (Δy). For each of the four corners, $p_1, p_2, p_3$ and $p_4$, the indirection texture S 600 is used to find a corresponding color in another texture image. In FIG. 6A, the coordinates $u_1, u_2, u_3, u_4$ correspond to the four coordinates stored in the indirection texture at corners, $p_1, p_2, p_3$ and $p_4$, which point to an integer location in the high-resolution texture image $E_H$ 605. Using the offset and the coordinates $u_1, u_2, u_3, u_4$ information, a color can be obtained for each corner of the enclosing cell 615. As shown in FIG. 6A, the offset with respect to each cell corner is applied to the coordinate $u_1, u_2, u_3, u_4$ to obtain a color at a point within the high-resolution texture image $E_H$ 605. This offset makes possible to exploit the additional samples present in between integer coordinates in the high-resolution texture image $E_H$ 605

For example, in the high-resolution texture image $E_H$ 605, the coordinate $u_1$ is offset by a first offset $(\Delta x, \Delta y)_1$, which was computed with respect to the upper left corner, $p_1$, of the enclosing cell 615. Applying this first offset gives a location of a first offset coordinate 630. Applying this first offset also generates a first sub-cell 635. This first sub-cell 635 outlines the integer cell corresponding to the enclosing cell 615 in the high-resolution texture image $E_H$ 605 for the upper left corner coordinate $u_1$. Similarly, the coordinate $u_2$ is offset by a second offset $(\Delta x$ and $\Delta y)_2$, which was computed with respect to the upper right corner, $p_2$, of the enclosing cell 615. Applying this second offset gives a location of a second offset coordinate 640, and generates a second sub-cell 645. The second sub-cell 645 outlines the integer cell corresponding to the enclosing cell 615 in the high-resolution texture image $E_H$ 605 for the upper right corner coordinate $u_2$. The coordinate $U_3$ is offset by a third offset $(\Delta x$ and $\Delta y)_3$, which was computed with respect to the lower left corner, $p_3$, of the enclosing cell 615. Applying this third offset gives a location of a third offset coordinate 650, and generates a third sub-cell 655. This third sub-cell 655 outlines the integer cell corresponding to the enclosing cell 615 in the high-resolution texture image $E_H$ 605 for the lower left corner coordinate $u_3$. Finally, the coordinate $u_4$ is offset by a fourth offset $(\Delta x$ and $\Delta y)_4$, which was computed with respect to the lower right corner, $p_4$, of the enclosing cell 615. Applying this fourth offset gives a location of a fourth offset coordinate 660, and generates a fourth sub-cell 665. The fourth sub-cell 665 outlines the integer cell corresponding to the enclosing cell 615 in the high-resolution texture image $E_H$ 605 for the lower right corner coordinate $u_4$ A color is obtained for each of the first coordinate 630, second coordinate 640, third coordinate 650, and fourth coordinate 660, by sampling the high-resolution texture image $E_H$ 605. This yields the four colors 670, $C_1, C_2, C_3, C_4$. These colors are combined to obtain a final color, C, for the desired coordinate p 610. In a preferred embodiment shown in FIG. 6A, this final color C is given by the formula 675. Repeating the above process for each pixel yields the magnified, high-resolution indirection texture result. Preferably, the four colors 670, $C_1, C_2, C_3, C_4$ are combined using a bilinear interpolation technique.

FIG. 6B illustrates a comparison between a prior art indirection texture method and the indirection texture magnification method of FIG. 6A. In particular, FIG. 6B illustrates, for the purposes of comparison, a traditional indirection texture method that uses the indirection texture, S, containing image coordinates 600. However, the traditional indirection texture method uses the low-resolution texture image $E_L$ 620 instead of the high-resolution texture image $E_H$ 605. Simply using the high-resolution texture image $E_H$ 605 instead of the low-resolution texture image $E_L$ 620 would not improve the result, since the additional pixels in the high-resolution texture image $E_H$ 605 would never get used.

For purposes of comparison, FIG. 6B shows the desired coordinates as p=(x,y) at point p 610. Also, the enclosing cell 615 is shown, which is defined by the samples at each corner of the enclosing cell 615, given by $p_1, p_2, p_3$ and $p_4$. The offset 625 formula is shown in FIG. 6B, although traditional indirection texture methods do not use this offset. The low-resolution texture image $E_L$ 620 sample to directly obtain a color for each of the coordinates $u_1, u_2, u_3, u_4$. It should be noted that no offset is used to obtain these colors. This yields the four colors 680, $C_1, C_2, C_3, C_4$. A final color, C, for the desired coordinate p 610, is given by the formula 685 shown in FIG. 6B. Once again the formula for the final color contains no offset.

The details of an exemplary working example of the indirection texture magnification system and method now will be discussed. It should be noted that this working example is only one of several ways in which the indirection texture magnification system and method may be implemented. This working example used the indirection texture magnification system and method in a texture synthesis application.

The results set forth in this working example were obtained on an NVIDIA GeForce 6800 Ultra using Microsoft DirectX 9. Exemplar sizes were 64×64 or 128×128.

The texture synthesis application used a sequence of pixel processing passes on a GPU, and were able to synthesize a $256^2$ window of deterministic texture in 28 msec, or pan the window at over 200 frames/sec. The indirection texture magnification system and method was used to amplify this content to fill a 1280×1024 screen in real time.

Following is the high-level shader language (HLSL) code used in the working example to implement the indirection texture magnification system and method:

```
sampler SL = sampler_state { ... MagFilter=Point; };
float sizeSL, sizeEL;    // equal to n, m
float ratio = sizeSL / sizeEL; // equal to σ
float4 MagnifyTexture(float2 p : TEXCOORD0) : COLOR {
  float2 pfrac = frac(p*sizeSL);
  float4 colors[2][2];
  for (int i=0; i<2; i++) for (int j=0; j<2; j++) {
    // Get patch coordinates at one of the 4 nearest samples.
    float2 u = tex2D(SL, p + float2(i,j) / sizeSL);
    // Extrapolate patch coordinates to current point p.
    float2 uh = u + (pfrac – float2(i,j)) / sizeSL;
    // Fetch color from the high-resolution exemplar.
    colors[i][j] = tex2D(EH, uh, ddx(p*ratio), ddy(p*ratio));
  }
  // Bilinearly blend the 4 colors.
  return lerp(lerp(colors[0][0], colors[0][1], pfrac.y),
              lerp(colors[1][0], colors[1][1], pfrac.y),
              pfrac.x);
}
```

In the common case that p lies in the interior of a patch, the 4 computed colors are identical, and the reconstructed texture simply duplicates a cell of the high-resolution exemplar $E_H$. If instead p lies at the boundary between 2-4 patches, the bilinear blending nicely feathers the inter-patch seams.

Figure 7:
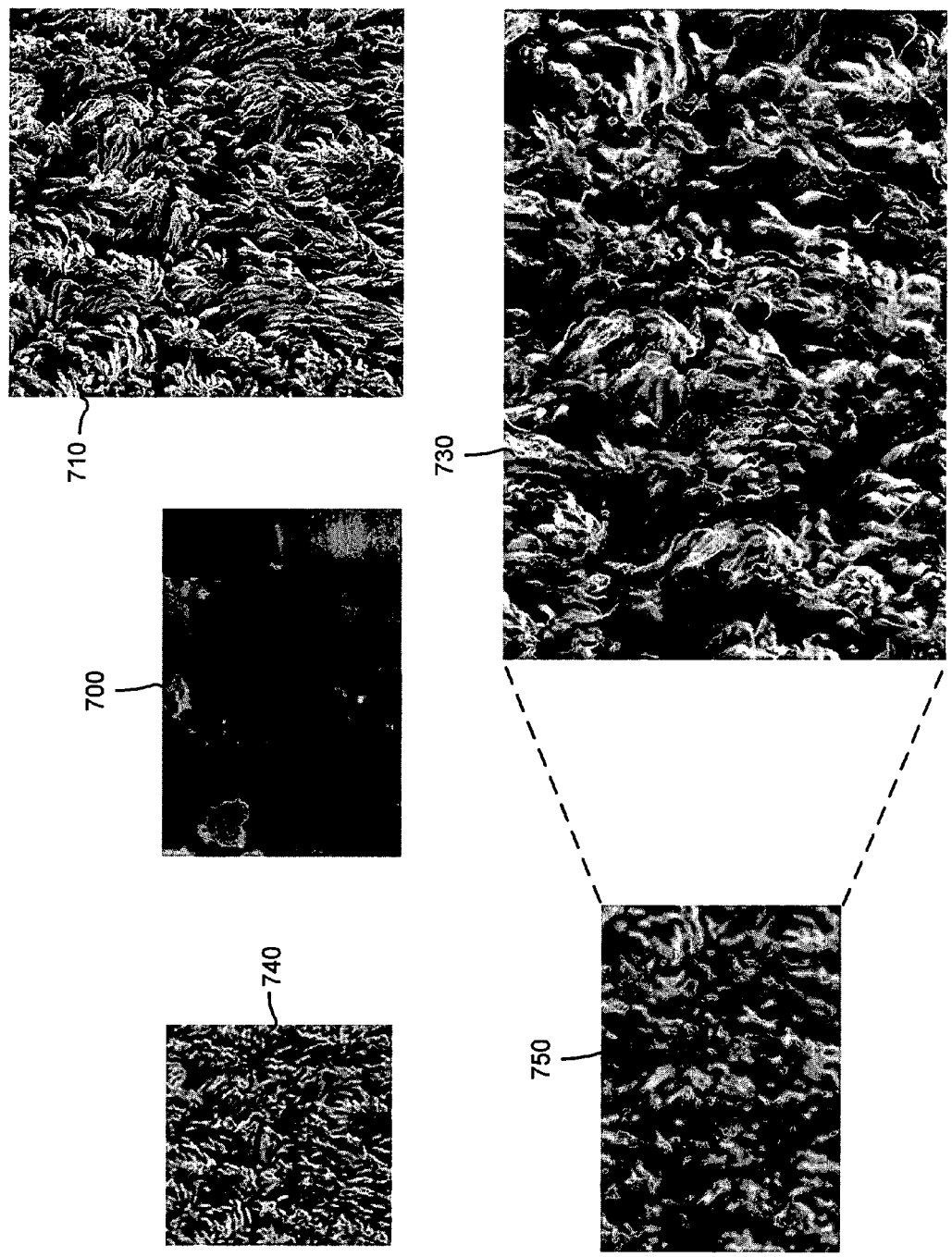
FIG. 7 is a first example, from a texture synthesis application, illustrating a comparison between results using traditional indirection texture methods and the indirection texture magnification system and method of FIGS. 2-6A.

FIG. 7 is a first example, from a texture synthesis application, illustrating a comparison between results using traditional indirection texture methods and the indirection texture magnification system and method of FIGS. 2-6A. As shown in FIG. 7, the indirection texture magnification system and method start with an indirection texture containing image coordinates 700 and a high-resolution texture image 710. The result processing by the indirection texture magnification system and method is a magnified, high-resolution indirection texture result 730. In comparison, using a traditional indirection texture method, the texture synthesis technique uses a low-resolution texture image 740 and outputs a low-resolution indirection texture result 750. By comparing the low-resolution indirection texture result 750 and the high-resolution indirection texture result 730 (which both are shown actual size), it can be seen that the latter provides a magnified and higher resolution (as shown by the dashed lines) final result than traditional indirection texture methods.

Figure 8:
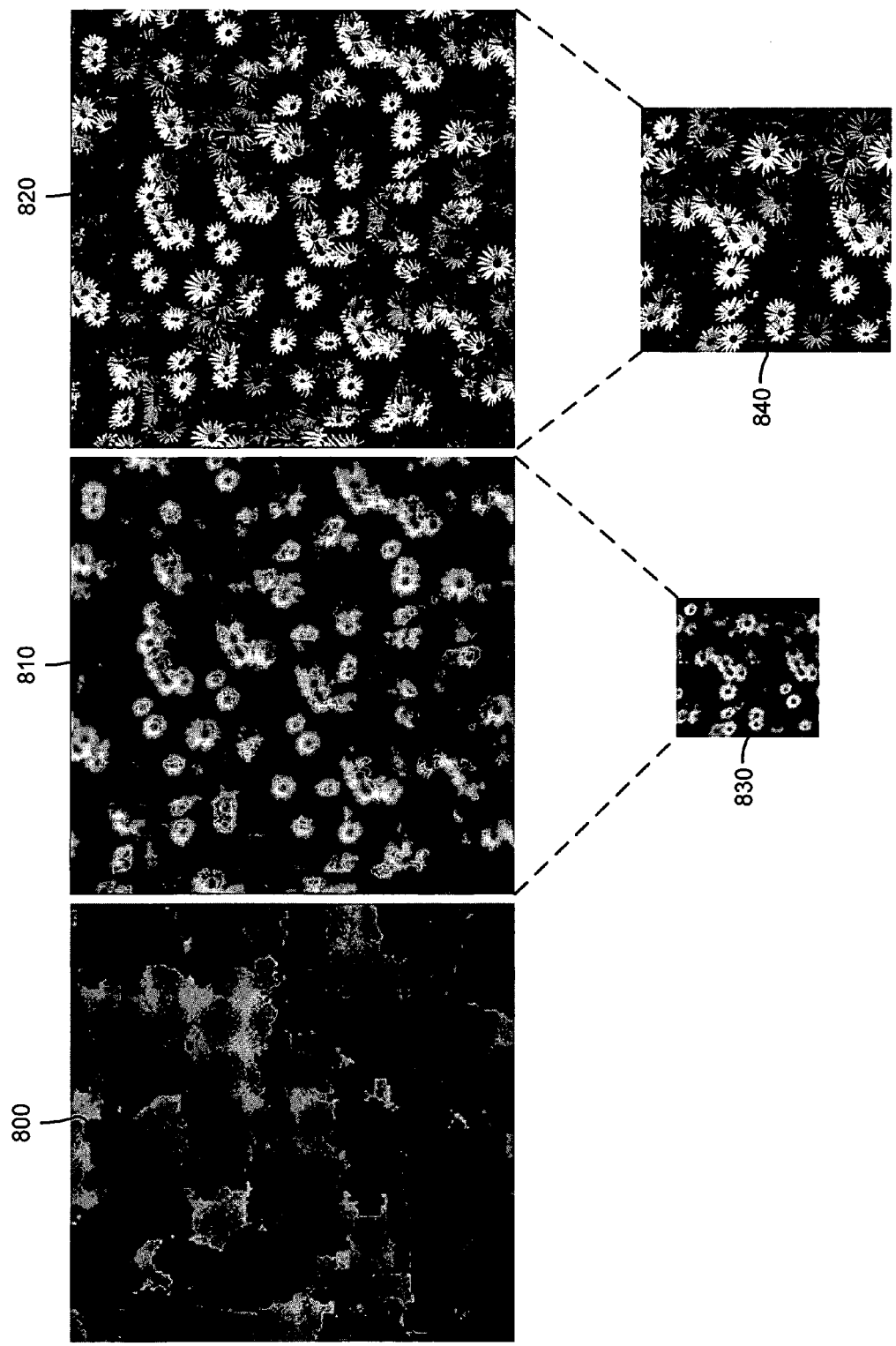
FIG. 8 is a second example, from a texture synthesis application, illustrating a comparison between results using traditional indirection texture methods and the indirection texture magnification system and method.

FIG. 8 is a second example, from a texture synthesis application, illustrating a comparison between results using traditional indirection texture methods and the indirection texture magnification system and method. FIG. 8 shows an indirection texture containing image coordinates 800, a low-resolution indirection texture result 810 obtained from traditional indirection texture methods, and a high-resolution indirection texture result 820 obtained using the indirection texture magnification system and method. It should be noted that the low-resolution indirection texture result 810 has been enlarged and that the high-resolution indirection texture result 820 is actual size. This was done for purposes of comparing the resolution between the two results.

Traditional indirection texture methods use a low-resolution texture image 830 to produce the low-resolution indirection texture result 810 (as shown by the dashed lines). The low-resolution texture image 830 is shown actual size. In comparison, the indirection texture magnification system and method use a high-resolution texture image 840 to produce the high-resolution indirection texture result 820. It can be seen that when compared to the low-resolution indirection texture result 810, the high-resolution indirection texture result 820 has superior results and quality.

Figure 9:
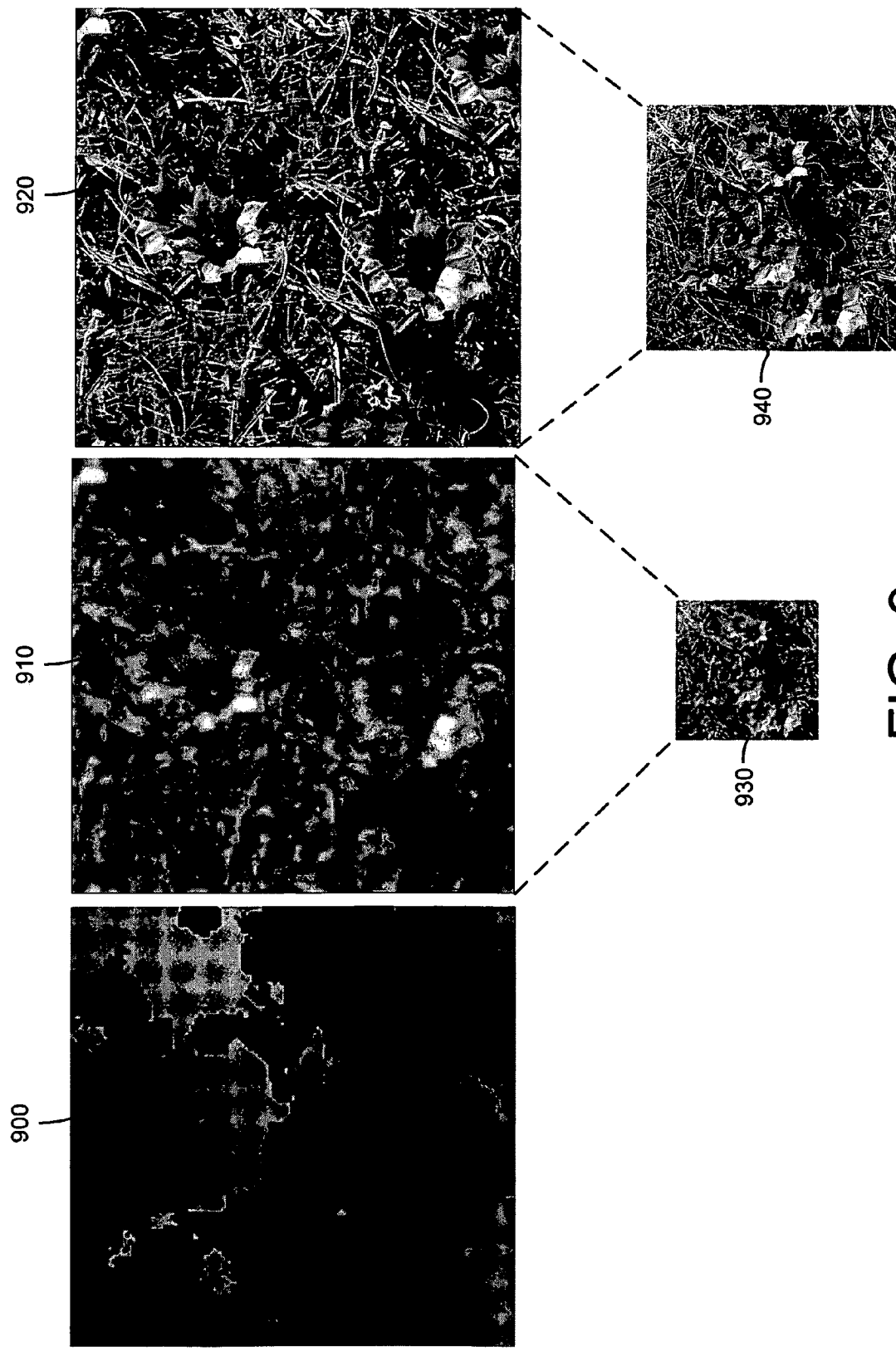
FIG. 9 is a third example, from a texture synthesis application, illustrating a comparison between results using traditional indirection texture methods and the indirection texture magnification system and method.

FIG. 9 is a third example, from a texture synthesis application, illustrating a comparison between results using traditional indirection texture methods and the indirection texture magnification system and method. FIG. 9 illustrates an indirection texture containing image coordinates 900, a low-resolution indirection texture result 910 obtained from traditional indirection texture methods, and a high-resolution indirection texture result 920 obtained using the indirection texture magnification system and method. As in FIG. 8, the low-resolution indirection texture result 910 has been enlarged and that the high-resolution indirection texture result 920 is actual size.

Traditional indirection texture methods use a low-resolution texture image 930 to produce the low-resolution indirection texture result 910, and the indirection texture magnification system and method use a high-resolution texture image 940 to produce the high-resolution indirection texture result 920 (as shown by the dashed lines). The low-resolution texture image 930 and the high-resolution texture image 940 are shown actual size. Once again, it can be seen that when compared to the low-resolution indirection texture result 910 obtained using traditional indirection texture methods, the high-resolution indirection texture result 920 obtained using the indirection texture magnification system and method produces superior results and quality.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A computer-implemented method for producing a magnified, high-resolution indirection texture result, comprising:

inputting an indirection texture, which contains image coordinates that map to pixels in a low-resolution texture image, and a high-resolution texture image, wherein the indirection texture is designed for use with a low-resolution texture image;

enhancing the image coordinates by obtaining colors of corresponding pixels in the high-resolution texture image to produce the magnified, high-resolution indirection texture result that contains more information than the low-resolution texture image; and replacing the low-resolution texture image with the high-resolution indirection texture result;

wherein the low-resolution texture image has a lower resolution than the high-resolution texture image.

2. The computer-implemented method of claim 1, wherein the computer-implemented method producing a magnified, high-resolution indirection texture result is implemented on a parallel processor.

3. The computer-implemented method of claim 1, wherein enhancing the image coordinates further comprises selecting a desired coordinates of a pixel from the magnified, high-resolution indirection texture result for which to obtain a final color.

4. The computer-implemented method of claim 3, further comprising defining an enclosing cell in the indirection texture that contains the desired coordinates.

5. The computer-implemented method of claim 4, further comprising retrieving image coordinates stored in the indirection texture at each corner of the enclosing cell to obtain retrieved image coordinates.

6. The computer-implemented method of claim 5, further comprising computing an offset of the desired coordinates with respect to each corner of the enclosing cell.

7. The computer-implemented method of claim 6, further comprising adding the computed offset to each of the retrieved image coordinates for each corner of the enclosing cell to obtain offset image coordinates.

8. The computer-implemented method of claim 7, further comprising using the offset image coordinates to sample the high-resolution texture image and obtain a color corresponding to each corner of the enclosing cell.

9. The computer-implemented method of claim 8, further comprising combining the colors for each corner of the enclosing cell based on a position of the desired coordinates in the enclosing cell of the indirection texture.

10. The computer-implemented method of claim 9, wherein the colors for each corner are combined based on a position of the desired coordinates in the enclosing cell of the indirection texture, using at least one of: (1) a bilinear interpolation technique; (2) a linear interpolation technique.

11. The computer-implemented method of claim 9, further comprising using a result from combining the colors to define a final color for the pixel having the desired coordinates in the magnified, high-resolution indirection texture result.

12. A computer-readable medium having computer-executable instructions for generating additional samples in an indirection texture result to produce a magnified, high-resolution indirection texture result, where the indirection texture is designed for use with a low-resolution texture image, comprising:
    determining desired coordinates for a pixel in the magnified, high-resolution indirection texture result;
    defining an enclosing cell in the indirection texture that encloses the desired coordinates;
    computing an offset for the desired coordinates for each corner of the enclosing cell; and
    using the offset to generate additional samples in the indirection texture.

13. The computer-readable medium of claim 12, further comprising retrieving image coordinates stored in the indirection texture at each corner for the enclosing cell to produce retrieved image coordinates.

14. The computer-readable medium of claim 13, further comprising:
    adding the offset for each corner of the enclosing cell to each of the corresponding retrieved image coordinates to obtain offset image coordinates; and
    sampling a high-resolution texture image to obtain a color for each of the offset image coordinates, wherein the high-resolution texture image is a high-resolution version of the low-resolution texture image.

15. The computer-readable medium of claim 14, further comprising using bilinear interpolation to combine the colors of the offset image coordinates to produce a final color for the pixel at the desired coordinates.

16. The computer-readable medium of claim 15, wherein using bilinear interpolation to combine the colors further comprises bilinearly blending the colors according to a position of the position of the pixel at the desired coordinates with respect to each of the four corners.

17. A computer-implemented process for generating a magnified high-resolution indirection texture result using an indirection texture designed for use with a low-resolution texture image, comprising:
    storing the indirection texture and a high-resolution texture image that is a higher-resolution version of the low-resolution texture image;
    selecting a desired pixel from the magnified high-resolution indirection texture result, the desired pixel having desired coordinates;
    finding an enclosing cell in the indirection texture that encloses the desired coordinates, the enclosing cell containing samples at each corner of the enclosing cell;
    recovering image coordinates stored in the indirection texture at each corner of the enclosing cell to generate retrieved image coordinates;
    computing an offset for each corner of the enclosing cell with respect to coordinates of the samples within the cell and a location of the corner; and
    using the offsets to obtain a color for each corner, wherein each color is combined into a final color for the desired pixel in the magnified high-resolution indirection texture result.

18. The computer-implemented process as set forth in claim 17, wherein the enclosing cell is one of: (1) a square enclosing cell having four corners; (2) a right isosceles triangle having three corners.

19. The computer-implemented process as set forth in claim 18, wherein the enclosing cell is a square enclosing cell, and further comprising generating the right isosceles triangle having three corners by dividing the square enclosing cell along a diagonal.

20. The computer-implemented process as set forth in claim 17, further comprising:
    using an interpolation technique to blend each of the colors at the offset image coordinates based on a position of the desired pixel in the enclosing cell to produce a final color at the desired coordinate, the interpolation technique including at least one of: (1) a bilinear interpolation technique; (2) a linear interpolation technique; and
    repeating the above process for each pixel in the magnified high-resolution indirection texture result.

* * * * *